United States Patent
Roh et al.

(10) Patent No.: US 7,483,096 B2
(45) Date of Patent: Jan. 27, 2009

(54) LIQUID CRYSTAL DISPLAY DEVICE

(75) Inventors: Nam-seok Roh, Seongnam-si (KR);
Soo-guy Rho, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 612 days.

(21) Appl. No.: 11/066,827

(22) Filed: Feb. 25, 2005

(65) Prior Publication Data

US 2005/0275769 A1  Dec. 15, 2005

(30) Foreign Application Priority Data

Jun. 11, 2004  (KR) .................. 10-2004-0042986

(51) Int. Cl.
*G02F 1/1335* (2006.01)
*G02F 1/1368* (2006.01)

(52) U.S. Cl. .................. 349/106; 349/43; 349/107; 349/108; 349/109

(58) Field of Classification Search .................. 349/106, 349/107, 108, 109, 42, 43; 359/885, 891; 345/88

See application file for complete search history.

(56) References Cited

U.S. PATENT DOCUMENTS 6,661,484 B1 * 12/2003 Iwai et al. .................. 349/107
6,989,876 B2 * 1/2006 Song et al. .................. 349/109

* cited by examiner

*Primary Examiner*—Dung Nguyen
*Assistant Examiner*—Tai Duong
(74) *Attorney, Agent, or Firm*—Cantor Colburn LLP

(57) ABSTRACT

A reflective liquid crystal display (LCD) is provided for efficiently preventing white coordinates from being yellowish. The LCD includes a substrate having red color filters, green color filters, and blue color filters. The blue color filters have an overall area smaller than that of the red color filters and the green color filters while blocking green light better than the red color filters and blocking red light better than the green color filters.

15 Claims, 9 Drawing Sheets

LIQUID CRYSTAL DISPLAY DEVICE

BACKGROUND OF THE INVENTION

1. Field of the Invention

The present invention relates to a liquid crystal display device, and more particularly, to a liquid crystal display (LCD) configured to effectively prevent white coordinates from being yellowish.

2. Description of the Related Art

In the pursuit of larger screen televisions in recent years, flat panel display devices, such as liquid crystal display devices (LCDs), plasma display panels (PDPs), or organic electroluminescent display (OLED) devices, have been actively developed in place of cathode ray tubes (CRTs). In particular, much attention has been paid to LCDs because they are small, thin, and light in weight compared to the other flat panel display devices.

A typical LCD is constructed such that a liquid crystal material having an anisotropic dielectric constant is injected between an upper insulating substrate and a lower insulating substrate. Common electrodes and color filters are formed on the upper insulating substrate, while thin-film transistors and pixel electrodes are formed on the lower insulating substrate. In addition, the molecular arrangement of the liquid crystal material is changed by variations in the field strength of an electric field formed in the liquid crystal material. The strength of the electric field is controlled by generating different potentials between the pixel electrodes and the common electrodes. Accordingly, the amount of light transmitted to the upper insulating substrate is controlled to display desired images. For example, upon application of an electric field, the molecules of the liquid crystal material layer change their orientation to change the polarization of light passing through the liquid crystal material layer. Appropriately positioned polarizing filters selectively block the polarized light, creating dark areas that can represent desired images. A representative example of such an LCD includes a thin-film transistor liquid crystal display (TFT LCD) using a TFT as a switching device.

The color filters for representing color images are provided on either of the panels and an organic insulating layer covering the color filters. The organic insulating layer is usually thick enough to smooth the surface of the panels such that the field generating electrodes thereon have a uniform flat surface.

However, the thick or organic layer reduces the light transmittance especially for the blue light, thereby causing so called yellowish phenomenon. In other words the color sensation becomes yellowish.

In general, an LCD is formed of pixels each having three colors, for example, red, green, and blue. An LCD having a pixel structure of four colors has recently been developed by adding white pixels to the red, green, and blue pixels to improve luminance and resolution.

However, in the case of a LCD having a pixel structure with four colors, the area of the blue pixels is relatively smaller than the area of the red pixels and the green pixels. Thus, the amount of blue element is reduced in the blue pixel area, and white coordinates move toward red and green pixel areas. Accordingly, the white coordinates become yellowish. In order to prevent such a problem, blue elements are increased in a back-light of a transmissive LCD, and thus, the white coordinates are prevented from being yellowish.

However, a reflective LCD and a transflective LCD use an external light source, such as natural light or indoor light and do not use a separate back-light. Thus, the blue elements of the light source for the reflective LCD and the transflective LCD cannot be increased. In addition, a red color filter R.F, a green color filter G.F, and a blue color filter B.F of the conventional reflective LCD use a color photoresist having a high transmittance to minimize the reduction in luminance due to color filtering, thus maximizing the luminance. Thus, the red color filter R.F, the green color filter G.F, and the blue color filter B.F cannot sufficiently block other colors as shown in the graph of FIG. 1. In other words, the blue color filter B.F cannot sufficiently block a red beam and a green beam, and the red color filter R.F cannot sufficiently block a blue beam and a green beam. Further, the green color filter G.F cannot sufficiently block a blue beam and a red beam. Thus, saturation of the colors is deteriorated, and the color reproducibility of the LCD is lowered. Accordingly, the yellowish problem is more serious in the LCD having the pixels of four colors, wherein the area of the blue pixels is smaller than the area of the red pixels and the green pixels.

SUMMARY OF THE INVENTION

The present invention provides a liquid crystal display (LCD) for efficiently preventing white coordinates from being yellowish.

The above discussed and other features and advantages of the present invention will become readily apparent from the following description.

According to an aspect of the present invention, there is provided an LCD comprising a substrate having red color filters, green color filters, and blue color filters having an overall area smaller than that of the red color filters and the green color filters while blocking green light better than the red color filters and blocking red light better than the green color filters.

In a preferred embodiment of the present invention, there is provided a LCD further comprising a thin-film transistor (TFT) substrate having a unit pixel group formed by arranging a red pixel, a blue pixel, and a green pixel in a first row and arranging a green pixel, a white pixel, and a red pixel in a second row, and by alternately arranging a red pixel and a green pixel in a first column and alternately arranging a blue pixel and a white pixel in a second column to arrange the red pixels and the green pixels to be diagonally opposite to each other and separated from each other by the blue pixel and the white pixel, which are in two adjacent rows, gate lines arranged in each pixel row in a lateral direction and transferring gate signals to the pixels, data lines arranged in each pixel column in a vertical direction while being insulated from the gate lines and transferring data signals, pixel electrodes formed in the pixels in a row direction and a column direction and receiving the data signals, and a TFT including gate electrodes formed in the pixels in the row direction and the column direction and connected to the gate lines, source electrodes connected to the data lines, and drain electrodes connected to the pixel electrodes, wherein the red pixels are formed corresponding to an area defined by the red color filters, the green pixels are formed corresponding to an area defined by the green color filters, and the blue pixels are formed corresponding to an area defined by the blue color filters.

In another embodiment of the present invention, there is provided a LCD further comprising a TFT substrate having a unit pixel group formed by arranging a red pixel, a blue pixel, and a green pixel in a first direction and arranging a green pixel, a white pixel, and a red pixel in the first direction, and by alternately arranging a red pixel and a green pixel in a second direction, which is perpendicular to the first direction, and alternately arranging a blue pixel and a white pixel in the second direction so that the red pixels and the green pixels are diagonally opposite to each other and are separated from each other by the blue pixel and the white pixel in the first direction while the blue pixel and the white pixel form one lozenge over two pixel rows, gate lines arranged in each pixel row in a lateral direction and transferring gate signals to the pixels, data lines arranged in each pixel column in a vertical direction while being insulated from the gate lines and transferring data signals, pixel electrodes formed in the pixels in the first direction and the second direction and receiving the data signals, and a TFT including gate electrodes formed in the pixels in the first direction and the second direction and connected to the gate lines, source electrodes connected to the data lines, and drain electrodes connected to the pixel electrodes, wherein the red pixels are formed corresponding to an area defined by the red color filters, the green pixels are formed corresponding to an area defined by the green color filters, and the blue pixels are formed corresponding to an area defined by the blue color filters.

This application claims priority from Korean Patent Application No. 10-2004-0042986 filed on Jun. 11, 2004 in the Korean Intellectual Property Office, the disclosure of which is incorporated herein by reference in its entirety.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
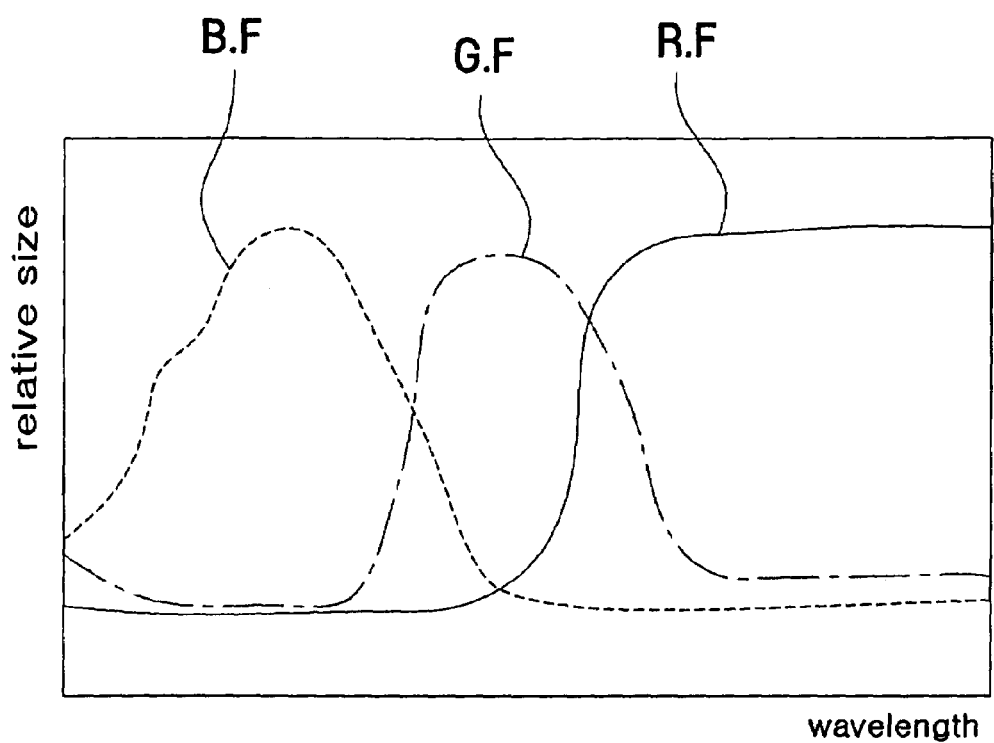
FIG. 1 is a graph illustrating spectrum characteristics of a red color filter, a green color filter, and a blue color filter in a conventional reflective liquid crystal display (LCD)

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Figure 2:
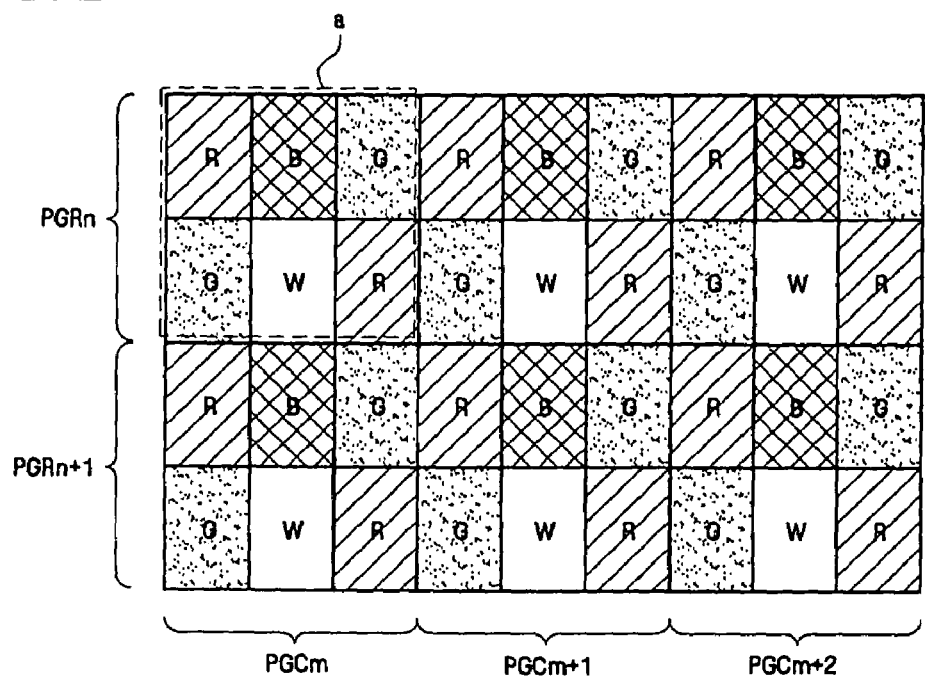
FIG. 2 illustrates the arrangement of pixels in LCD according to a first embodiment of the present invention.

A liquid crystal display (LCD) will now be described with reference to FIGS. 2 through 4. FIG. 2 illustrates the arrangement of pixels in a LCD according to a first embodiment of the present invention, FIG. 3 illustrates the arrangement of the pixels and a thin-film transistor (TFT) substrate in the LCD according to the first embodiment of the present invention, and FIG. 4 is a cross section view of FIG. 3 cut along line IV-IV'.

A unit pixel group "a" of the LCD according to the first embodiment of the present invention is formed by arranging a red pixel R, a blue pixel B, and a green pixel G in a first row and arranging a green pixel G, a white pixel W, and a red pixel R in a second row below the first row as illustrated. In other words, the unit pixel group a is formed by arranging a red pixel R and a green pixel G in a first column, arranging a blue pixel B and a white pixel W in a second column, and arranging a green pixel G and a red pixel R in a third column. Accordingly, the pixels of the same colors, i.e., the two red pixels R and the two green pixels G, are diagonally opposite to each other and are separated from each other by the blue pixel B and the white pixel W, which are arranged in the same column and adjacent rows. In addition, the unit pixel groups a are sequentially arranged in rows PGRn, and PGRn+1 and in columns PGCm, PGCm+1, and PGCm+2.

Figure 3:
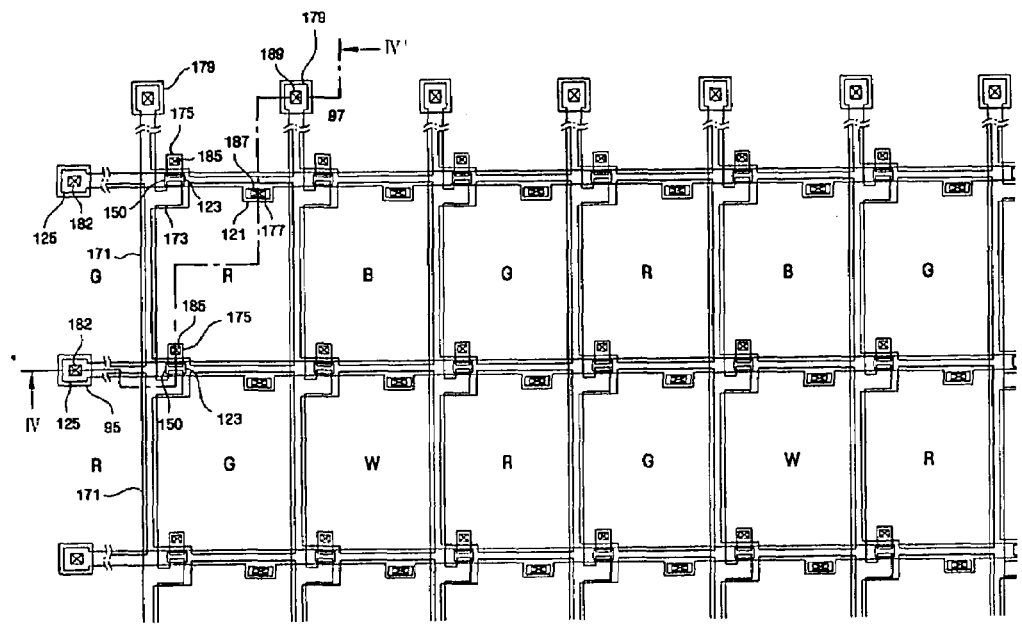
FIG. 3 illustrates the arrangement of the pixels and a thin-film transistor (TFT) substrate in the LCD according to the first embodiment of the present invention.
Figure 4:
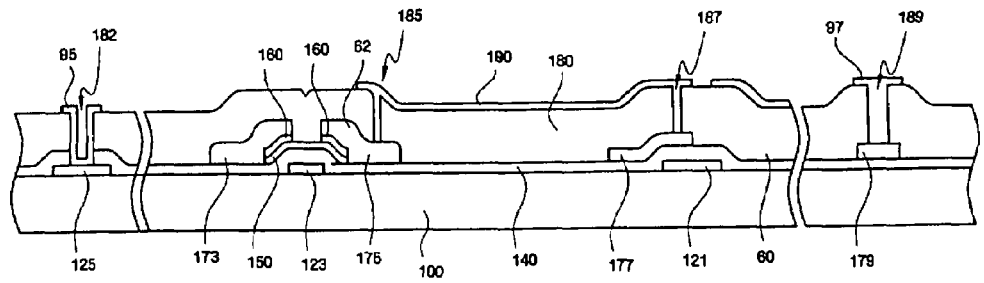
FIG. 4 is an enlarged cross section view of FIG. 3 cut along the line IV-IV'.

In the LCD according to the first embodiment, gate lines 121 for transferring gate signals are formed in each pixel row, in a lateral direction, and data lines 171 for transferring data signals and defining a unit pixel by crossing the gate lines 121 are formed in each pixel column, in a vertical direction, as shown in FIG. 3. The data lines 171 are insulated from the gate lines 121. When a light source is input from the outside, each unit pixel reflects the light.

A thin-film transistor (TFT) includes a gate electrode 123 connected to the gate line 121, a source electrode 173 connected to the data line 171 and formed at one side of the gate electrode 123, a drain electrode 175 formed at the opposite side of the gate electrode 123 to the source electrode 173 and a semiconductor layer 150 formed at a crossing portion of the gate line 121 and the data line 171. In addition, a pixel electrode 190, which is electrically connected to the gate lines 121 and the data lines 171 through the TFT, is formed in each pixel. A conductive pattern 177 for a storage capacitor, which overlaps the pixel electrode 190 to form a storage capacitor, is formed at the same layer as the gate lines 121. Furthermore, the conductive pattern 177 for the storage capacitor is formed over the gate lines 121 and is connected to the pixel electrode 190 through a contact hole 187.

The contact hole 187 of a protective layer 180, which protects the pixel electrode 190 and a data wire (to be explained below), is formed on the conductive pattern 177 for the storage capacitor. Data pads 179 for receiving the data signals from the outside and transferring the data signals to the data lines 171 are connected to each data line 171. Accordingly, each pixel row receives the data signals through the data pads 179 connected to the data lines 171.

Describing the structure of the TFT of the LCD more specifically, a gate wire is formed on a lower insulating substrate 100, as shown in FIG. 4. Here, the gate wire includes the gate line 121 formed for each pixel row, a gate pad 125, which is connected to the end of the gate line 121 to receive the gate signals from the outside and transfer the gate signals to the gate line 121, and the gate electrode 123 of the TFT, which is connected to the gate line 121. A gate insulating layer 140, which is formed of silicon nitride (Si3N4), is formed on the lower insulating layer 100 to cover the gate wire.

An island-shaped semiconductor layer 150, which is formed of amorphous silicon, is formed on the gate insulating layer 140 disposed over the gate electrode 123. In addition, ohmic contact layers 160 highly doped with an n-type impurity are formed on the semiconductor layer 150.

The data wire is formed on the ohmic contact layers 160 and the gate insulating layer 140. Here, the data wire includes the data lines 171 (FIG. 3), which are formed in a vertical direction and define the pixels by crossing the gate lines 121, and the source electrode 173, which is connected to an end of the data line 171 and extends to the upper portion of the ohmic contact layer 160. The data pad 179 for receiving the data signals from the outside is separated from the source electrode 173. In addition, the data wire includes the drain electrode 175, which is formed on the ohmic contact layer 160 on the opposite side of the gate electrode 123 to the source electrode 173.

The protective layer 180 is formed on the data wire and the semiconductor layer 150. Here, the protective layer 180 includes contact holes 185 and 189, which expose the drain electrode 175 and the data pad 179, respectively, and a contact hole 182, which exposes the gate pad 125 along with the gate insulating layer 140.

The pixel electrode 190, which is electrically connected to the drain electrode 175 through the contact hole 185 and located on the pixel, is formed on the protective layer 180. In addition, an auxiliary gate pad 95 and an auxiliary data pad 97, which are connected to the gate pad 125 and the data pad 179 through the contact holes 182 and 189, respectively, are formed on the protective layer 180.

Figure 5:
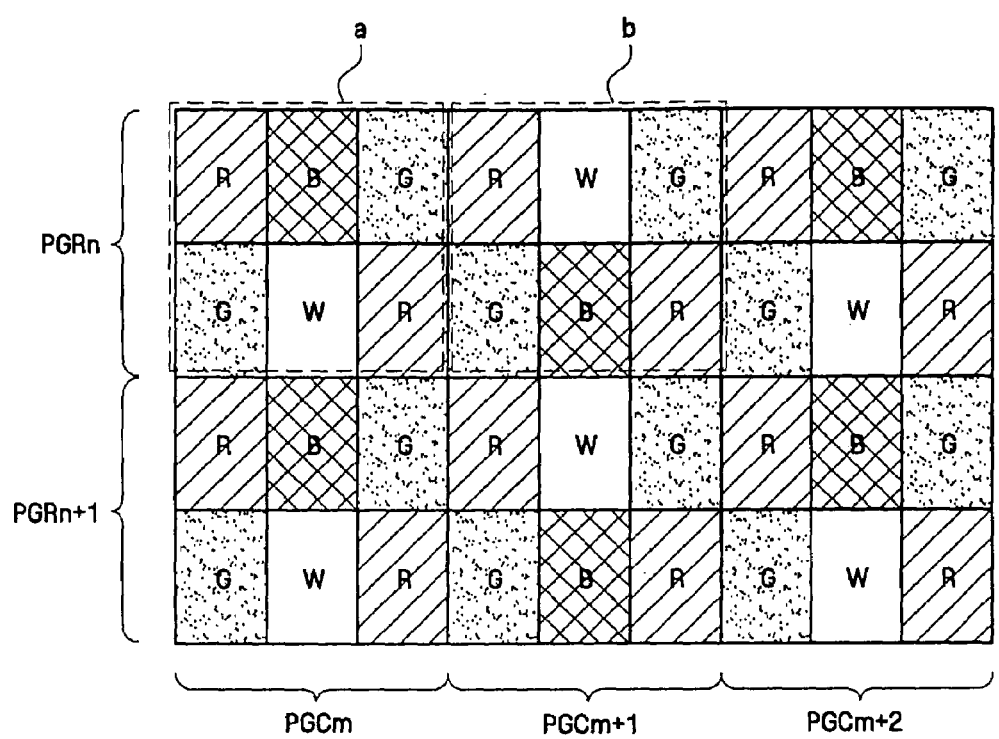
FIG. 5 illustrates an example of the arrangement of pixels in the LCD according to the first embodiment of the present invention.

Referring now to FIG. 5, a unit pixel group a of the LCD according to an example of the first embodiment of the present invention is formed by arranging a red pixel R, a blue pixel B, and a green pixel G in a first row and arranging a green pixel G, a white pixel W, and a red pixel R in a second row. In other words, the unit pixel group a is formed by arranging a red pixel R and a green pixel G in a first column, arranging a blue pixel B and a white pixel W in a second column, and arranging a green pixel G and a red pixel R in a third column, as in FIG. 2. Accordingly, the pixels of the same colors, in other words, the red pixels R and the green pixels G, are diagonally opposite to each other and are separated from each other by the blue pixel B and the white pixel W, which are arranged in the same column and the adjacent rows.

Still referring to FIG. 5, however the first pixel row includes a first pixel unit of a red pixel R, a blue pixel B, and a green pixel G, and a second pixel unit of a red pixel R, a white pixel W, and a green pixel G. The first pixel unit and second pixel unit are alternately arranged. A second pixel row includes a third pixel unit of a green pixel G, a white pixel W, and a red pixel R, and a fourth pixel unit of a green pixel G, a blue pixel B, and a red pixel R. The third pixel unit and the fourth pixel unit are alternately arranged. Thus, the first and third pixel units form one unit pixel group "a", and the second and fourth pixel units form another unit pixel group "b".

Here, the pixels are grouped in the first through fourth pixel units for the convenience of description; however, the first through fourth pixel units are not used to display one dot of images.

The unit pixel groups a and b are repeatedly arranged in either a row direction indicated by rows PGRn and PGRn+1 or a column direction indicated by columns PGCm, PGCm+1, and PGCm+2. Thus, when repeatedly arranging the unit pixel group a and the unit pixel group b in the row direction, the blue pixel B is arranged above the white pixel W in the unit pixel group a, and the white pixel W is arranged above the blue pixel B in the unit pixel group b, as shown in FIG. 5.

Figure 6:
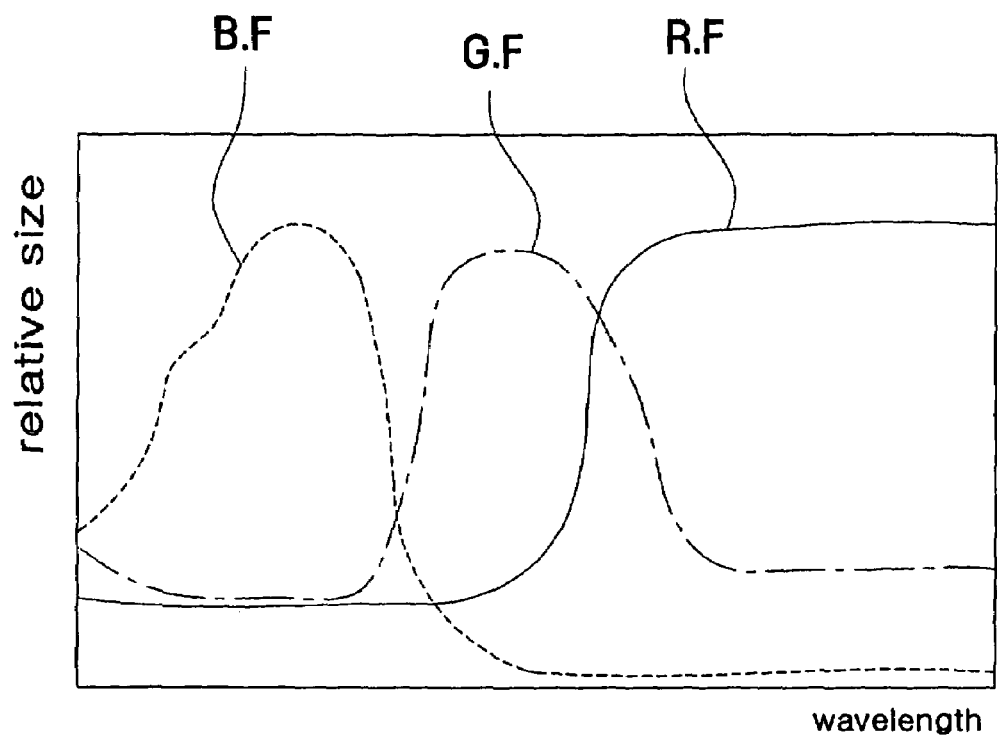
FIG. 6 is a graph illustrating a spectrum characteristic of a red color filter, a green color filter, and a blue color filter in LCD according to the present invention.
Figure 7:
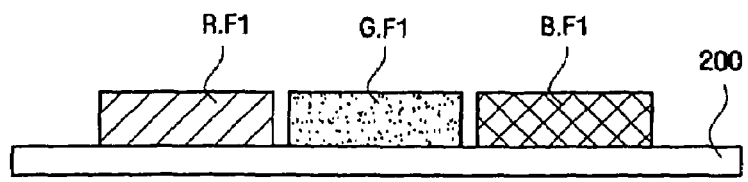
FIG. 7 is a cross section view illustrating a red color filter, a green color filter, and a blue color filter that are applied to the LCD according to the first embodiment of the present invention.
Figure 8:
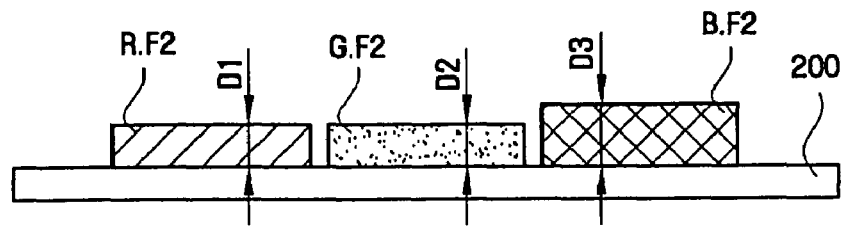
FIG. 8 is a cross section view illustrating a first example of a red color filter, a green color filter, and a blue color filter that are applied to the LCD according to another embodiment of the present invention.
Figure 9:
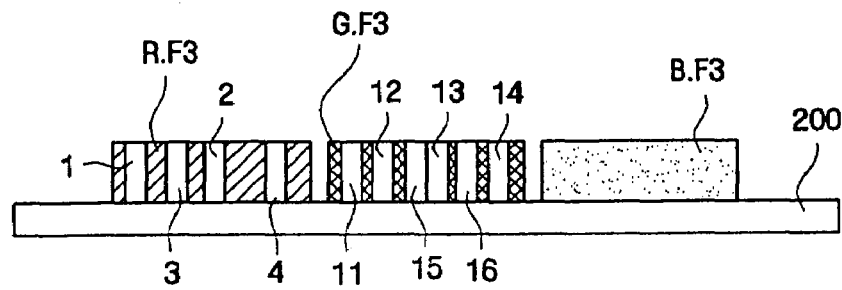
FIG. 9 is a cross section view illustrating a second example of a red color filter, a green color filter, and a blue color filter that are applied to the LCD according to yet another embodiment of the present invention.

A red color filter, a green color filter, and a blue color filter of the LCD according to the first embodiment of the present invention will now be described with reference to FIGS. 6 through 9. FIG. 6 is a graph illustrating a spectrum characteristic of a red color filter, a green color filter, and a blue color filter in the LCD according to the present invention. FIG. 7 is a cross section view illustrating a red color filter, a green color filter, and a blue filter applied to the LCD according to the first embodiment of the present invention. FIG. 8 is a cross section view illustrating a first example of a red color filter, a green color filter, and a blue filter applied to the LCD according to another embodiment of the present invention. FIG. 9 is a cross section view illustrating a second example of a red color filter, a green color filter, and a blue filter applied to the LCD according to yet another embodiment of the present invention.

A red color filter R.F is formed to face a pixel area defined by the red pixel R on an upper insulating substrate 200, and a green color filter G.F is formed to face a pixel area defined by the green pixel G. In addition, a blue color filter B.F is formed to face a pixel area defined by the blue pixel B on the upper insulating substrate 200. However, a color filter is absent in a pixel area defined by the white pixel W. Here, the area of the blue pixel B is smaller than either of the areas of the red pixel R and the green pixel G, thus the area of the blue color filter B.F is smaller than either of the areas of the red color filter R.F and the green color filter G.F.

Referring to FIG. 6, the red color filter R.F blocks green light and blue light, and the green color filter G.F blocks red light and blue light. However, the blue color filter B.F blocks green light better than the red color filter R.F and also blocks red light better than the green color filter G.F. Thus, the red and green elements are reduced in the blue pixel area, thus white coordinates move to blue coordinates to prevent the white coordinates from being yellowish.

A red color filter R.F1, a green color filter G.F1, and a blue color filter B.F1 applied to the LCD according to the first embodiment of the present invention are formed on an upper insulating substrate 200 to correspond to each pixel area defined by a red pixel R, a green pixel G, and a blue pixel B, as shown in FIG. 7. Here, the color reproducibility of the blue color filter B.F1 is higher than the color reproducibility of the red color filter R.F1 and the green color filter G.F1. In addition, the red color filter R.F1, the green color filter G.F1, and the blue color filter B.F1 are formed to the same thickness. The composite ratios of colorants added to coloring layers are controlled to increase the color reproducibility of the blue color filter B.F1 compared to the color reproducibility of the red color filter R.F1 and the green color filter G.F1. Thus, the blue color filter B.F1 is able block the green light better than the red color filter R.F1 and is also able to block the red light better than the green color filter G.F1.

The color reproducibility of the blue color filter B.F1 may be twice as high or more than the color reproducibility of the red color filter R.F1 and the green color filter G.F1. When the color reproducibility of the blue color filter B.F1 is less than twice the color reproducibility of the red color filter R.F1 and the green color filter G.F1, the blue color filter B.F1 cannot properly block the green light and the red light. Thus, the white coordinates are not prevented from being yellowish.

For example, the color reproducibility of the blue color filter B.F1 may be controlled to be about 40%, and the color reproducibility of the red color filter R.F1 and the green color filter G.F1 may be controlled to each be about 20%, respectively, in order for the reproducibility of the blue color filter B.F1 to be twice the color reproducibility of the red color filter R.F1 and the green color filter G.F1.

A first example of the red color filter R.F1, the green color filter G.F1, and the blue color filter B.F1 of FIG. 7 are formed on an upper insulating substrate 200 as a red color filter R.F2, a green color filter G.F2, and a blue color filter B.F2 corresponding to each pixel area defined by a red pixel, a green pixel, and a blue pixel, respectively, as shown in FIG. 8. Here, a thickness D3 of the blue color filter B.F2 is larger than a thickness D1 of the red color filter R.F2 and a thickness D2 of the green color filter G.F2. In this case, the composite ratios of colorants added to coloring layers of the red color filter R.F2, the green color filter G.F2, and the blue color filter B.F2 are the same; however, the thickness D3 of the blue color filter B.F2 is controlled to be larger than either the thickness D1 of the red color filter R.F2 or the thickness D2 of the green color filter G.F2. Accordingly, the blue color filter B.F2 may block green light better than the red color filter R.F2 and block red light better than the green color filter G.F2. More specifically, the thickness D3 of the blue color filter B.F2 may be twice the thickness D1 of the red color filter R.F2 and twice the thickness D2 of the green color filter G.F2. Otherwise, the blue color filter B.F2 cannot properly block the green light and the red light, and thus, white coordinates cannot be prevented from being yellowish.

A second example of the red color filter R.F1, the green color filter G.F1, and the blue color filter B.F1 of FIG. 8 are formed on an upper insulating substrate 200 as a red color filter R.F3, a green color filter G.F3, and a blue color filter B.F3 corresponding to each pixel area defined by a red pixel, a green pixel, and a blue pixel, respectively, as shown in FIG. 9. Here, the density of light holes of the blue color filter B.F3 is lower than the density of light holes 1 through 4 of the red color filter R.F3 and the density of light holes 11 through 16 of the green color filter G.F3. The thickness of the red color filter R.F3, the green color filter G.F3, and the blue color filter B.F3, and the ratios of colorants added to coloring layers of the red color filter R.F3, the green color filter G.F3, and the blue color filter B.F3 are controlled to be the same; however, the density of the light holes of the blue color filter B.F3 is lower than the densities of the light holes 1 through 4 and 11 through 16 of the red color filter R.F3 and the green color filter G.F3, respectively. Accordingly, the blue color filter B.F3 may block green light better than the red color filter R.F3 and block red light better than the green color filter G.F3. More specifically, the density of the light holes of the blue color filter B.F3 may be less than half the densities of the light holes 1 through 4 and 11 through 16 of the red color filter R.F3 and the green color filter G.F3, respectively. Otherwise, the blue color filter B.F3 cannot properly block the green light and the red light, and thus, white coordinates cannot be prevented from being yellowish.

Figure 10:
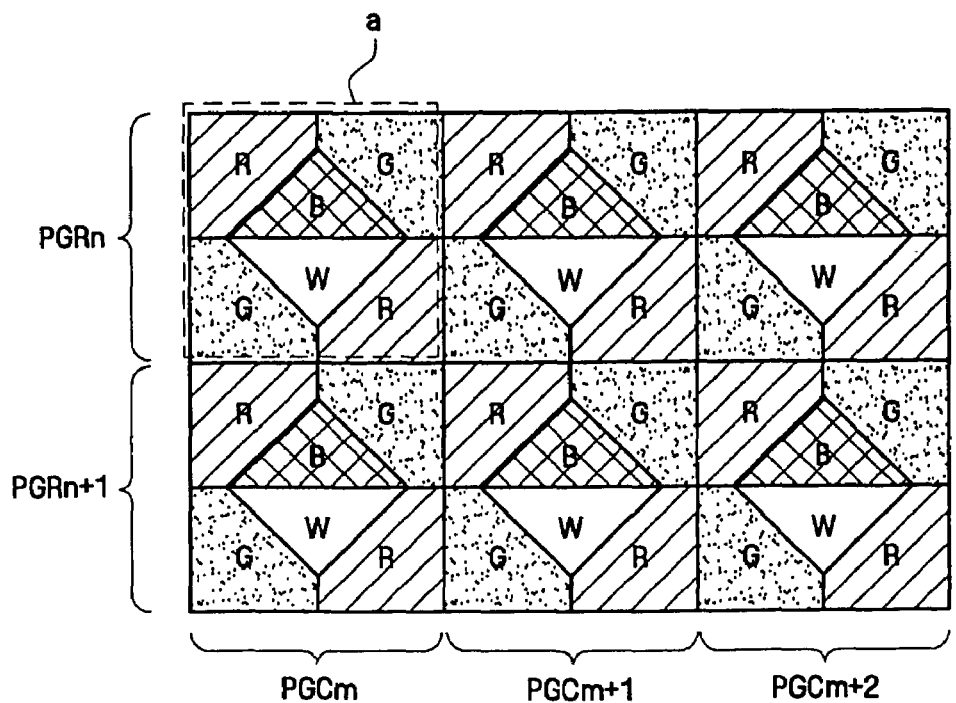
FIG. 10 illustrates the arrangement of pixels in LCD according to a second embodiment of the present invention.
Figure 11:
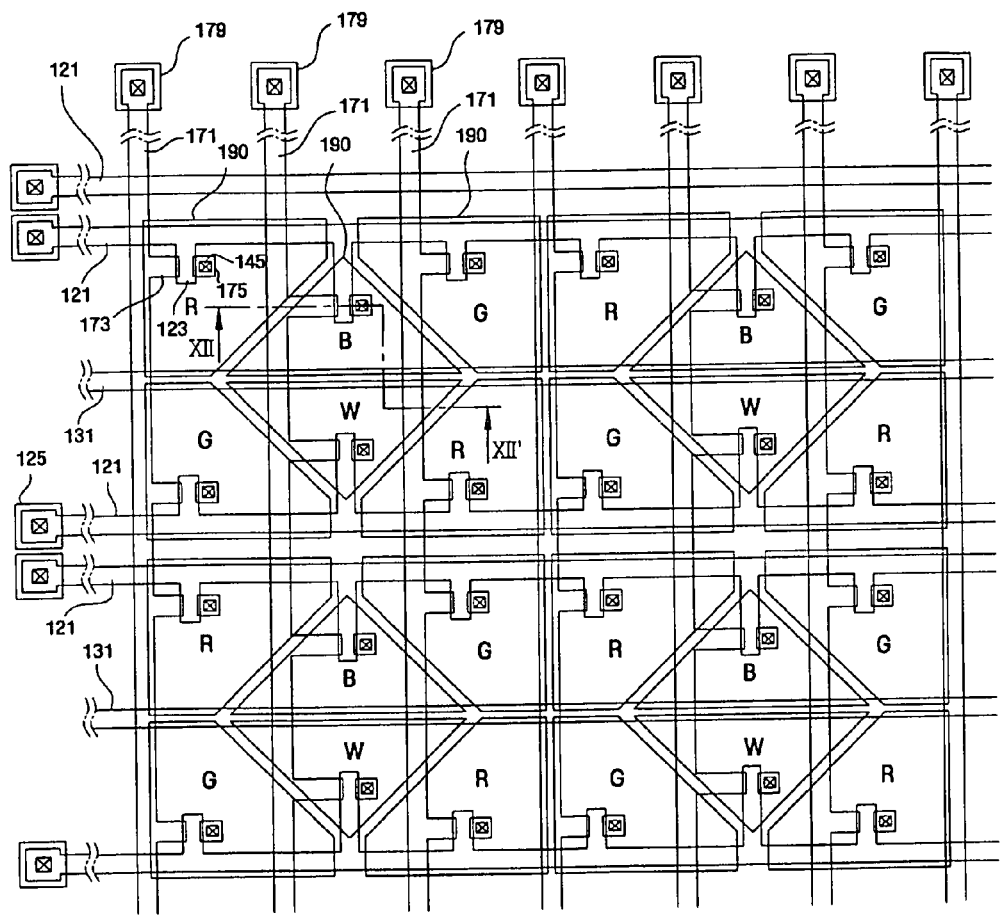
FIG. 11 illustrates the arrangement of the pixels and a TFT substrate in the LCD according to the second embodiment of the present invention.
Figure 12:
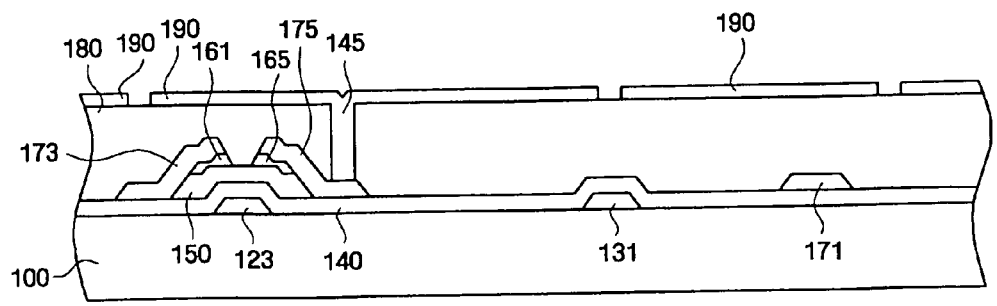
FIG. 12 is an enlarged cross section view of FIG. 11 cut along the line XII-XII'.

An LCD according to a second embodiment of the present invention will now be described with reference to FIGS. 10 through 12. FIG. 10 illustrates the arrangement of pixels in an LCD according to a second embodiment of the present invention. FIG. 11 illustrates the arrangement of the pixels and a TFT substrate in an LCD according to the second embodiment of the present invention. FIG. 12 is a cross section view of FIG. 11 cut along the line XII-XII'.

A unit pixel group "a" of a LCD according to the second embodiment of the present invention is formed by arranging a red pixel R, a blue pixel B, and a green pixel G in a first row and arranging a green pixel G, a white pixel W, and a red pixel R in a second row, as shown in FIG. 10. The unit pixel group a is formed by arranging a red pixel R and a green pixel G in a first column and arranging a blue pixel B and a white pixel W in a second column. Accordingly, the pixels of the same colors, in other words, the red pixels R and the green pixels G, are diagonally opposite to each other and are separated from each other by the blue pixel B and the white pixel W that are arranged in a same column and adjacent rows.

In the LCD according to the second embodiment of the present invention, the blue pixel B and the white pixel W are located at a center of the unit pixel group a forming a lozenge. In other words, the blue pixel B and the white pixel W, which are located in the same column and the adjacent rows, are formed in triangles sharing a bases that is parallel with the row direction. The blue pixel B and the white pixel W may be referred to as forming a lozenge, which is formed over two pixel rows and divided in the row direction, as shown in FIG. 10.

In addition, four pixels, such as two red pixels R and two green pixels G, are arranged around the blue pixel B and the white pixel W having the lozenge shape. Pixels of the same color are diagonally opposite to each other and separated by the lozenge shape. Here, two red pixels R are diagonally opposite to each other and are separated from each other by the blue pixel B and the white pixel W, and two green pixels G are diagonally opposite to each other and are separated from each other by the blue pixel B and the white pixel W. In addition, the unit pixel groups a are sequentially arranged in the rows PGRn and PGRn+1 and in the columns PGCm, PGCm+1 and PGCm+2.

In the LCD according to the second embodiment of the present invention, gate lines 121 for transferring gate signals to each pixel row are formed in each pixel row, in a lateral direction, as shown in FIG. 11. Here, the gate lines 121 formed in two adjacent pixel rows are arranged to face each other centering upon the pixels of each pixel row.

In addition, data lines 171 for transferring data signals to each pixel row are formed in a vertical direction in each pixel column. The data lines 171 cross the gate lines 121.

Here, the data lines 171 are insulated from the gate lines 121. A TFT is formed at a crossing portion of the gate line 121 and the data line 171. The TFT includes a gate electrode 123 connected to the gate line 121, a source electrode 173 formed at one side of the gate electrode 123 and connected to the data line 171, a drain electrode 175 formed at the opposite side of the gate electrode 123 from the source electrode 173, and a semiconductor layer 150. In addition, a pixel electrode 190, which is electrically connected to the gate lines 121 and the data lines 171 through the TFT, is formed in each pixel. When a light source is input from the outside, each unit pixel reflects the light.

Storage capacitor lines 131 are formed in a lateral direction to form a storage capacitor by overlapping the pixel electrode 190 in the same layer as the gate lines 121. The storage capacitor lines 131 are formed on the boundaries of the pixel rows in order to overlap the pixel electrodes 190 corresponding to the red pixels R, the blue pixels B, the green pixels G, and the white pixels W formed in two adjacent rows.

The data lines 171 are connected to the drain electrode 175. The data pads 179 for receiving the data signals from the outside and transferring the data signals to the data lines 171 are connected to each data line 171. Accordingly, each pixel row receives the data signals through the data pads 179 connected to the data lines 171.

Describing the structure of the TFT of the LCD according to the second embodiment of the present invention more specifically, a gate wire and a storage wire are formed on a lower insulating substrate 100. Here, the gate wire includes the gate line 121 formed in a lateral direction and the gate electrode 123 of the TFT, which is a portion of the gate line 121. In addition, the gate wire may include gate pads 125 connected to the ends of the gate lines 121. Here, the gate electrodes 123 connected to one gate line 121 are formed in each blue pixel B row. The storage wire overlaps the pixel electrode 190 to form a storage capacitor, which improves a charge preserving capacity of the pixels.

A data wire formed of a conductive material of low resistance is formed on a gate insulating layer 140 covering the gate wire and the storage wire. Here, the data wire includes the data lines 171, which are formed in a vertical direction, as illustrated, and arranged to overlap with each pixel row, the source electrode 173, which is formed on one side of the gate electrode 123 and is connected to the data line 171, and the drain electrode 175, which is formed on the opposite side of the gate electrode 123 from the source electrode 173 and the semiconductor layer 150 of the TFT. In addition, the data wire may include data pads 179 connected to one end of the data lines 171. The data pads 179 receive the data signals from the outside.

The data lines 171 are separately arranged in each pixel row to prevent shorts between the data lines 171 and to prevent interference between the data signals transferred to the data lines 171.

Here, the data wire may be formed in a single layer structure as with the gate wire. However, the data wire may be formed in a double layer structure or a triple layer structure. When the data wire is formed of more than two layers, one layer is formed of a material having a low resistance and another layer is formed of a material having an excellent contact characteristic.

A protective layer 180, which is formed of silicon nitride ($Si_3N_4$) or an acrylic-based organic insulating material, is formed on the data wire and the semiconductor layer 150. In addition, the pixel electrodes 190 connected to the drain electrode 175 through a contact hole 145 that is formed in the protective layer 180 according to the shapes of the pixels R, B, G, and W.

Since the LCD according to the second embodiment of the present invention includes any one of the red color filters R.F1 through R.F3, any one of the green color filters G.F1 through G.F3, and any one of the blue color filters B.F1 through B.F3 that are described with reference to FIGS. 7 through 9, the blue color filters B.F1 through B.F3 can block green light better than the red color filters R.F1 through R.F3 and block red light better than the green color filters G.F1 through G.F3. Thus, the red and green elements are reduced in the blue pixel area. As a result, the white coordinates move toward the blue coordinates, and the white coordinates may be prevented from being yellowish.

Figure 13:
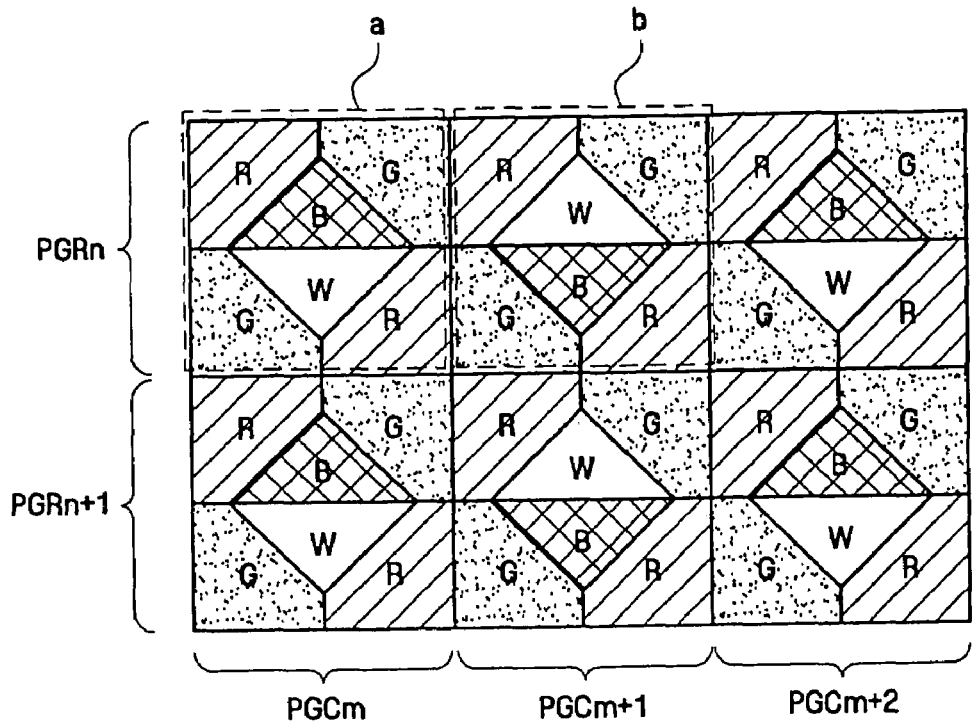
FIG. 13 illustrates an example of the arrangement of pixels in the LCD according to the second embodiment of the present invention.

An example of the unit pixel group of the LCD according to the second embodiment of the present invention is shown in FIG. 13. Referring to FIG. 13, a unit pixel group a is formed by arranging a red pixel R, a blue pixel B, and a green pixel in a first row, and arranging a green pixel G, a white pixel W, and a red pixel R in a second row. In addition, the unit pixel group a is formed by alternately arranging a red pixel R and a green pixel G in a first column and alternately arranging a blue pixel B and a white pixel W in a second column. Thus, the pixels of the same colors, in other words, the red pixels R and the green pixels G, are arranged to be diagonally opposite to each other and are separated from each other by the blue pixel B and the white pixel W, which are located in the same column and the adjacent rows.

In addition, the unit pixel group a and a unit pixel group b are repeatedly arranged in rows PGRn and PGRn+1 or in columns PGCm, PGCm+1, and PGCm+2, as in the case of the example of the LCD according to the first embodiment of the present invention. Accordingly, as shown in FIG. 13, when the unit pixel group a and the unit pixel group b are repeatedly arranged in the row direction, the blue pixel B is arranged above the white pixel W in one unit pixel group a, and the white pixel W is arranged above the blue pixel B in the adjacent unit pixel group b.

Figure 14:
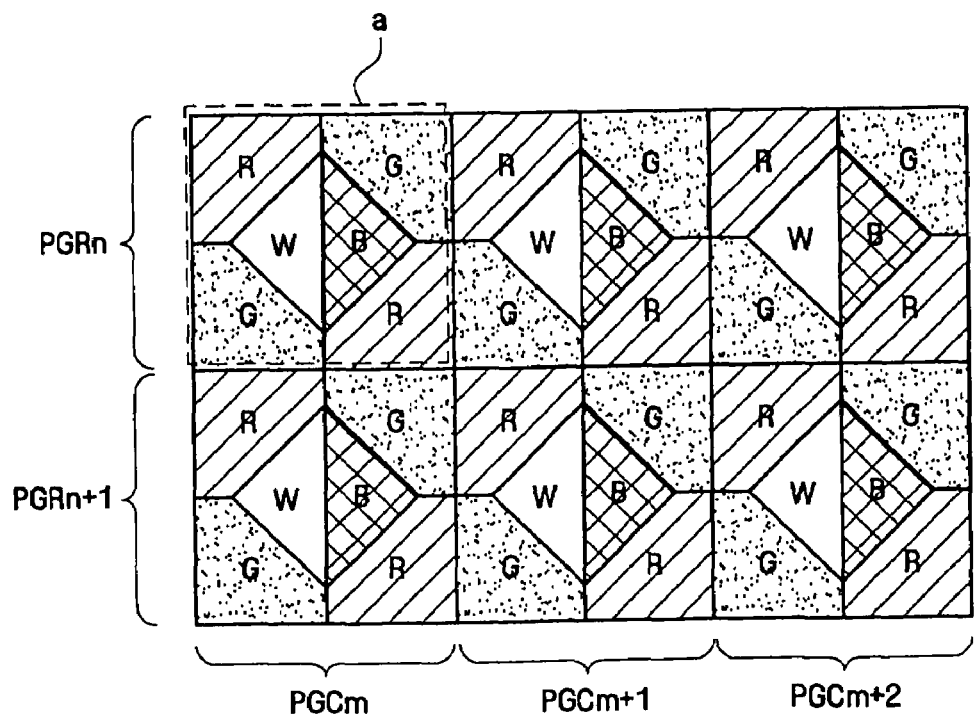
FIG. 14 illustrates the arrangement of pixels in LCD according to a third embodiment of the present invention.

A LCD according to a third embodiment of the present invention will now be described with reference to FIG. 14. FIG. 14 illustrates the arrangement of pixels in a LCD according to a third embodiment of the present invention.

Referring to FIG. 14, in a unit pixel group a of the LCD according to the third embodiment of the present invention, a blue pixel B and a white pixel W located in adjacent columns form a lozenge, as in the case of the unit pixel group of the LCD according to the second embodiment of the present invention.

Here, the blue pixel B and the white pixel W are formed as triangles having bases that are in parallel with the column direction. In other words, one blue pixel B and one white pixel W are formed over two adjacent pixel columns while having vertexes at the boundary of the adjacent pixel columns and bases corresponding to each other. The blue pixel B and the white pixel W may be referred to as forming a lozenge, which is divided in the column direction.

In addition, four pixels, such as two red pixels R and two green pixels G, are diagonally arranged around the blue pixel B and the white pixel W in the lozenge shape, as in the case of the unit pixel group of the LCD according to the second embodiment of the present invention. The unit pixel groups a are sequentially arranged in rows PGRn and PGRn+1 and in columns PGCm, PGCm+1 and PGCm+2.

A person skilled in the art may easily know the structure of a TFT of the LCD according to the third embodiment of the present invention based on the structure of the TFT of the LCD according to the second embodiment of the present invention. Thus descriptions of the structure of the TFT of the LCD according to the third embodiment of the present invention will be omitted.

In an example of the unit pixel group of the LCD according to the third embodiment of the present invention, the pixels in a triangle shape have bases in a column direction. In other words, one blue pixel B and one white pixel W are formed over two adjacent pixel columns while having vertexes at the boundary of the adjacent pixel rows and bases corresponding to each other to form a lozenge. The blue pixel B and the white pixel W may be referred to as forming a lozenge, which is divided in the column direction.

Figure 15:
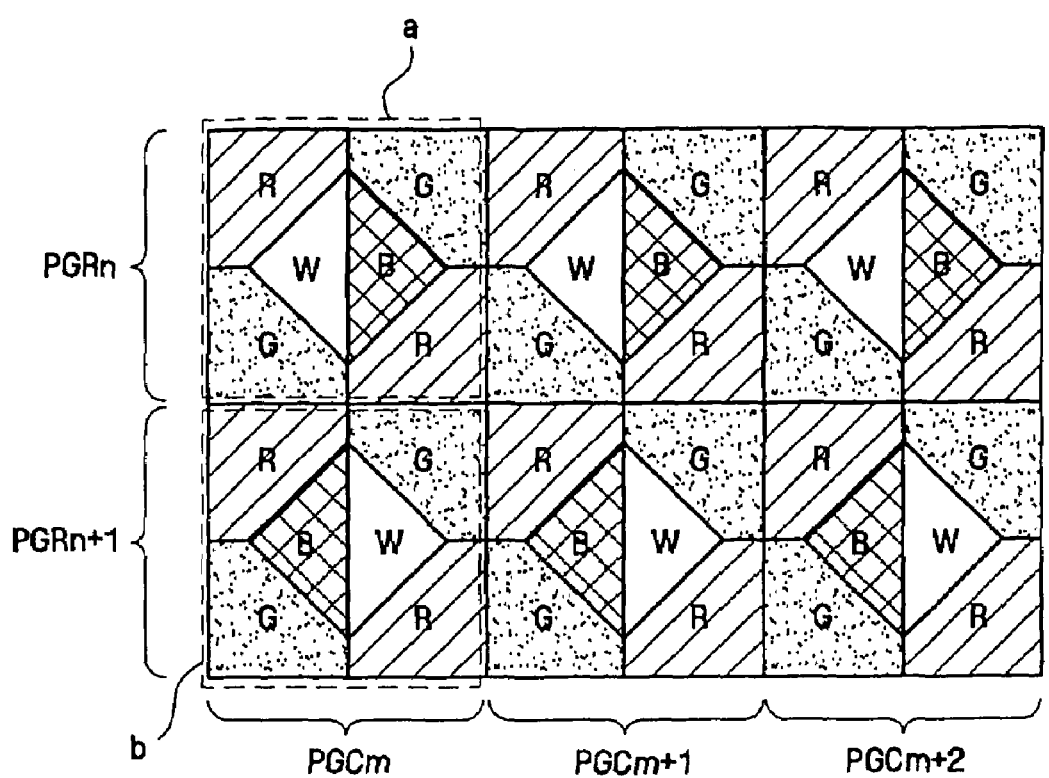
FIG. 15 illustrates an example of another arrangement of pixels in the LCD according to the third embodiment of the present invention.

Referring now to FIG. 15, a unit pixel group a and a unit pixel group b are alternately repeatedly arranged in either rows PGRn and PGRn+1 or columns PGCm, PGCm+1, and PCGm+2. Thus, when the unit pixel groups a and b are repeatedly arranged in columns PGCm, PGCm+1, and PGCm+2, as shown in FIG. 15, the blue pixel B is arranged at the right side of the white pixel W in the unit pixel group a, and the white pixel W is arranged at the right side of the blue pixel B in the adjacent unit pixel group b.

The LCDs according to the first through third embodiments of the present invention are referred to as reflective LCDs; however, the present invention may be applied to a transflective LCD in which a unit pixel of a pixel group has an area that reflects an external light source, such as natural light or indoor light, and an area that transmits an internal light source, such as a back-light.

The LCD according to the present invention and described with reference to the first through third embodiments of the present invention efficiently prevent the white coordinates from being yellowish.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A liquid crystal display (LCD) comprising:
   a substrate having:
      red color filters;
      green color filters; and
      blue color filters having an overall area smaller than that of the red color filters and the green color filters while blocking green light better than the red color filters and blocking red light better than the green color filters,
      wherein a thickness of the blue color filters is thicker than a thickness of the red color filters or the green color filters.

2. The LCD of claim 1, wherein the thickness of the blue color filters is at least about twice the thickness of the red color filters or the green color filters.

3. The LCD of claim 1 further comprising:
   a thin-film transistor (TFT) substrate having:
      a unit pixel group formed by arranging a red pixel, a blue pixel, and a green pixel in a first row and arranging a green pixel, a white pixel, and a red pixel in a second row, and by alternately arranging a red pixel and a green pixel in a first column and alternately arranging a blue pixel and a white pixel in a second column to arrange the red pixels and the green pixels to be diagonally opposite to each other and separated from each other by the blue pixel and the white pixel, which are in two adjacent rows;
      gate lines arranged in each pixel row in a first direction and transferring gate signals to the pixels;
      data lines arranged in each pixel column in a second direction substantially normal to the first direction while being insulated from the gate lines and transferring data signals;
      pixel electrodes receiving the data signals, the pixel electrodes formed in the pixels in a row direction corresponding to the first direction and a column direction corresponding to the second direction; and
      a TFT including gate electrodes formed in the pixels in the row direction and the column direction and connected to the gate lines, source electrodes connected to the data lines, and drain electrodes connected to the pixel electrodes,
      wherein the red pixels are formed corresponding to an area defined by the red color filters, the green pixels are formed corresponding to an area defined by the green color filters, and the blue pixels are formed corresponding to an area defined by the blue color filters.

4. The LCD of claim 3, wherein the unit pixel group is sequentially and repeatedly arranged in the row direction and the column direction.

5. The LCD of claim 3, wherein the unit pixel group is repeatedly arranged in any one of the row direction and the column direction and arranged so that the locations of the blue pixel and the white pixel are alternately changed in an opposite direction.

6. The LCD of claim 1 further comprising:
   a TFT substrate having:
      a unit pixel group formed by arranging a red pixel, a blue pixel, and a green pixel in a first direction and arranging a green pixel, a white pixel, and a red pixel in the first direction, and by alternately arranging a red pixel and a green pixel in a second direction perpendicular to the first direction, and alternately arranging a blue pixel and a white pixel in the second direction so that the red pixels and the green pixels are diagonally opposite to each other and are separated from each other by the blue pixel and the white pixel in the first direction while the blue pixel and the white pixel form one lozenge over two pixel rows;
      gate lines arranged in each pixel row in the first direction and transferring gate signals to the pixels;
      data lines arranged in each pixel column in the second direction while being insulated from the gate lines and transferring data signals;
      pixel electrodes formed in the pixels in the first direction and the second direction and receiving the data signals; and
      a TFT including gate electrodes formed in the pixels in the first direction and the second direction and connected to the gate lines, source electrodes connected to the data lines, and drain electrodes connected to the pixel electrodes,
      wherein the red pixels are formed corresponding to an area defined by the red color filters, the green pixels are formed corresponding to an area defined by the green color filters, and the blue pixels are formed corresponding to an area defined by the blue color filters.

7. The LCD of claim 6, wherein the unit pixel group is sequentially and repeatedly arranged in the first direction and the second direction.

8. The LCD of claim 6, wherein the unit pixel group is repeatedly arranged in any one of the first direction and the second direction and arranged so that the locations of the blue pixel and the white pixel are alternately changed in an opposite direction.

9. A liquid crystal display (LCD) comprising:
   a thin-film transistor (TFT) substrate having:
      a unit pixel group formed by arranging a red pixel, a blue pixel, and a green pixel in a first row and arranging a green pixel, a white pixel, and a red pixel in a second row, and by alternately arranging a red pixel and a green pixel in a first column and alternately arranging a blue pixel and a white pixel in a second column to arrange the red pixels and the green pixels to be diagonally opposite to each other and separated from each other by the blue pixel and the white pixel, which are in two adjacent rows;

gate lines arranged in each pixel row in a lateral direction and transferring gate signals to the pixels;

data lines arranged in each pixel column in a vertical direction substantially normal to the lateral direction while being insulated from the gate lines and transferring data signals;

pixel electrodes receiving the data signals, the pixel electrodes formed in the pixels in a row direction corresponding to the lateral direction and a column direction corresponding to the vertical direction; and a TFT including gate electrodes formed in the pixels in the row direction and the column direction and connected to the gate lines, source electrodes connected to the data lines, and drain electrodes connected to the pixel electrodes, wherein the red pixels are formed aligning with an area defined by red color filters, the green pixels are formed aligning with an area defined by green color filters, and the blue pixels are formed aligning with an area defined by blue color filters, the blue, red, and green color filters formed on a separate substrate from the TFT substrate, the blue color filters having an overall area smaller than that of the red color filters and the green color filters while blocking green light better than the red color filters and blocking red light better than the green color filters.

10. The LCD of claim 9, wherein a color reproducibility of the blue color filters is higher than a color reproducibility of the red color filters and the green color filters.

11. The LCD of claim 10, wherein the color reproducibility of the blue color filters is at least about twice as high or more than the color reproducibility of the red color filters and the green color filters.

12. The LCD of claim 9, wherein a thickness of the blue color filters is thicker than a thickness of the red color filters or the green color filters.

13. The LCD of claim 12, wherein the thickness of the blue color filters is at least about twice the thickness of the red color filters or the green color filters.

14. The LCD of claim 9, wherein a density of light holes of the blue color filters is lower than a density of light holes of the red color filters or the green color filters.

15. The LCD of claim 14, wherein the density of the light holes of the blue color filters is lower than half of the density of the light holes of the red color filters or the green color filters.

* * * * *